United States Patent
Shaheen

(10) Patent No.: US 12,035,269 B2
(45) Date of Patent: Jul. 9, 2024

(54) METHOD AND APPARATUS FOR REPORTING MULTI-USIM UE CAPABILITY SUPPORTING DIFFERENT OPERATORS

(71) Applicant: SHARP KABUSHIKI KAISHA, Sakai (JP)

(72) Inventor: Kamel M. Shaheen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 334 days.

(21) Appl. No.: 17/622,621

(22) PCT Filed: Jun. 25, 2020

(86) PCT No.: PCT/JP2020/024955
§ 371 (c)(1),
(2) Date: Dec. 23, 2021

(87) PCT Pub. No.: WO2021/002268
PCT Pub. Date: Jan. 7, 2021

(65) Prior Publication Data
US 2022/0361133 A1    Nov. 10, 2022

Related U.S. Application Data

(60) Provisional application No. 62/870,607, filed on Jul. 3, 2019.

(51) Int. Cl.
*H04W 60/00* (2009.01)
*H04W 8/20* (2009.01)
(Continued)

(52) U.S. Cl.
CPC .......... *H04W 60/005* (2013.01); *H04W 8/20* (2013.01); *H04W 68/12* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 2015/0312717 A1* | 10/2015 | Shih | ...................... | H04W 4/025 455/456.1 |
| 2020/0351818 A1* | 11/2020 | Park | ...................... | H04W 4/90 |

OTHER PUBLICATIONS

"3rd Generation Partnership Project; Technical Specification Group Core Network and Terminals; Test specification for (U)SIM; Application Programming Interface (API) for Java Card™(Release 15)", 3GPP TS 31.213 V15.0.0(Jul. 2018).

(Continued)

*Primary Examiner* — Kenneth B Wells
(74) *Attorney, Agent, or Firm* — ScienBiziP, P.C.

(57) ABSTRACT

A user equipment (UE) for wireless communication includes one or more non-transitory computer-readable media having computer-executable instructions embodied thereon, at least one processor coupled to the non-transitory computer-readable media, and configured to execute the computer-executable instructions to: detect a presence of a first multiple-universal subscriber identity module (USIM) based operation and a second USIM based operation in the UE, the first USIM based operation belonging to a first Public Land Mobile Network (PLMN), the second USIM based operation belonging to a second PLMN different than the first PLMN; perform a first registration procedure, using the first USIM based operation, with the first PLMN; perform a second registration procedure, using the second USIM based operation, with the second PLMN; wherein the UE receives information of one or more operation gaps during the first registration procedure, and performs the second registration procedure during at least one of the operation gaps.

2 Claims, 11 Drawing Sheets

(51) Int. Cl.
*H04W 68/12* (2009.01)
*H04W 84/04* (2009.01)

(56) References Cited

OTHER PUBLICATIONS

Intel, "New WID: Service Support for Multi-USIM devices", S1-190110, 3GPP TSG-SA WG1 Meeting #85, Tallin, Estonia, Feb. 18-22, 2019.
Ericsson, "Dual-SIM Dual-Standby UEs and their impact on the RAN", R2-115375, 3GPP TSG-RAN WG2 #75bis, Zhuhai, China Oct. 10-14, 2011.

* cited by examiner

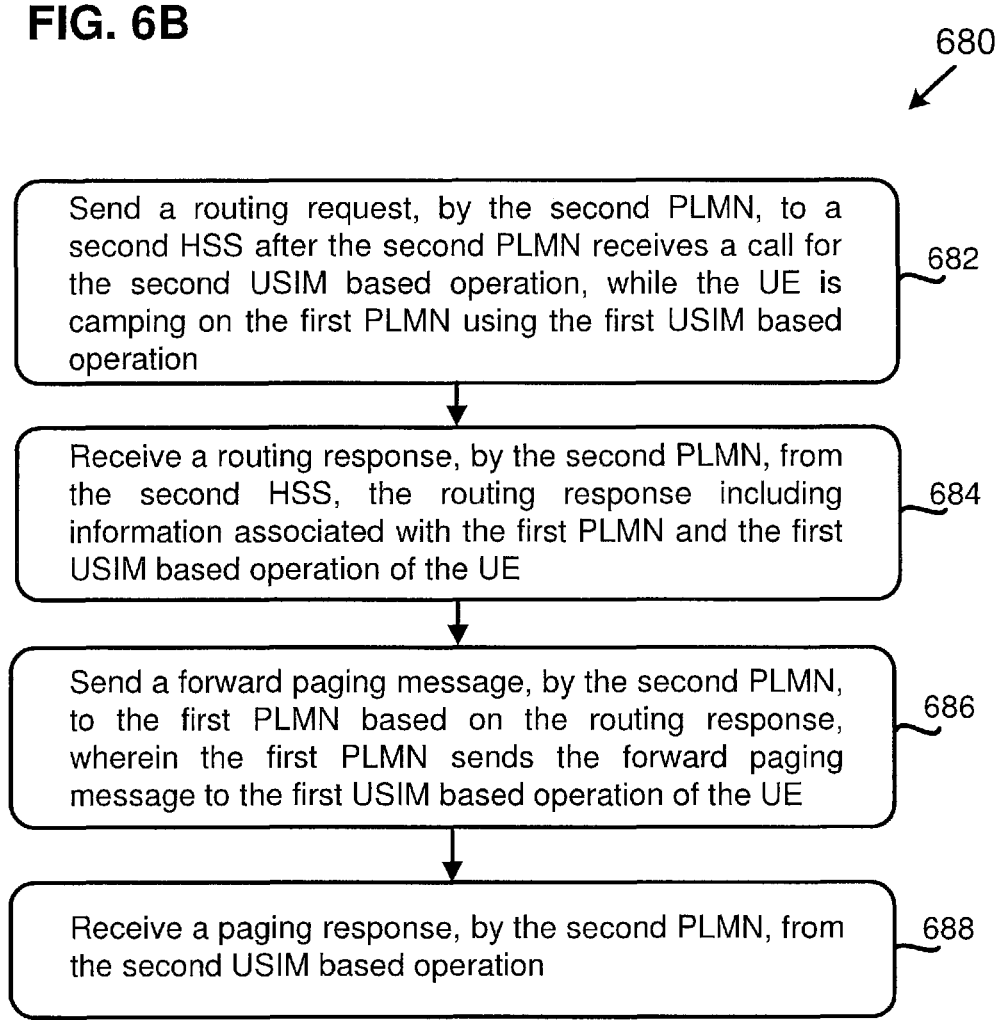

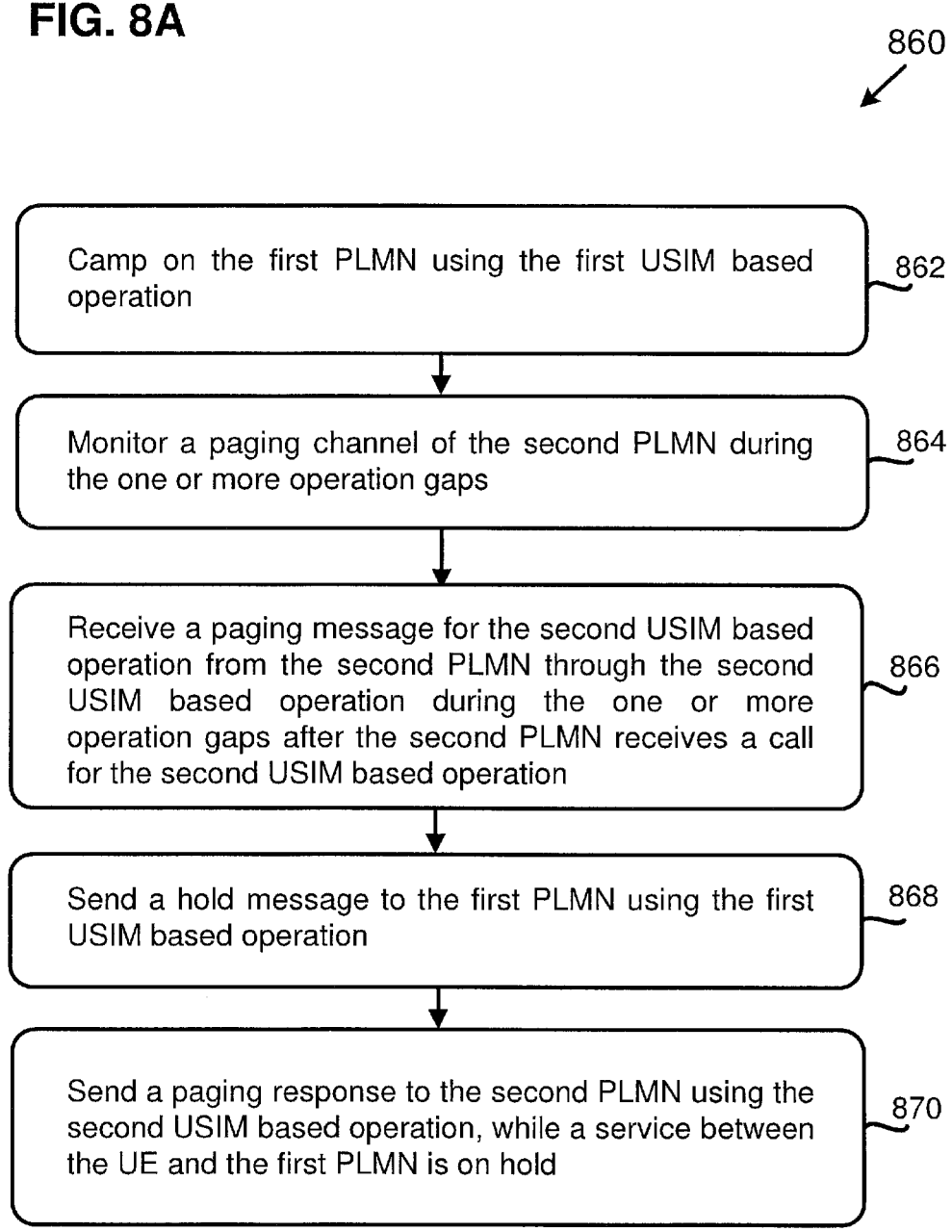

METHOD AND APPARATUS FOR REPORTING MULTI-USIM UE CAPABILITY SUPPORTING DIFFERENT OPERATORS

TECHNICAL FIELD

The present disclosure generally relates to wireless communication, and more particularly, to multiple-universal subscriber identity module (multi-USIM) based operations in a user equipment (UE) supporting different operators.

BACKGROUND ART

In wireless communication systems, support for multi-USIM based operations in a UE is handled in an implementation-specific manner without any support from 3rd Generation Partnership Project (3GPP) specifications, resulting in a variety of implementations and UE behaviors. In a multi-USIM device, the USIMs typically share common radio and baseband components. Thus, the multi-USIM device may register in different networks but using one radio front-end (RF) and base band.

In the next generation (e.g., fifth generation (5G) new radio (NR) wireless communication networks, a multi-USIM UE is expected to be in Radio Resource Control (RRC) Connected state with only one network at a time, while being able to receive paging, perform signal measurements, or read system information, and determine if it needs to respond to paging requests from other networks. With a single RF platform, however, the UE must listen to paging of the other connection(s), and the network needs to be aware of the multi-registration scenario. When a UE is paged on a second system while connected to a first system, the paged UE may drop the connection on the first system and attempt to access the second system without releasing the first connection due to lack of time to switch systems. Such behaviors can cause performance degradations and reductions in overall system capacity.

On the network end, the current network systems remain ignorant of the UEs' capability to support multi-USIM based operations. In order to support multi-USIM UEs, the network systems need to be aware of such capabilities in order to coordinate the operations of multi-USIM registrations, potential simultaneous operations and collision avoidance.

Thus, there is a need in the art for a multi-USIM based operation UE and multi-network coordination.

SUMMARY OF INVENTION

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: detect a presence of multiple-universal subscriber identity module (multi-USIM) based operations having at least a first USIM based operation and a second USIM based operation in the UE, the first USIM based operation belonging to a first Public Land Mobile Network (PLMN), the second USIM based operation belonging to a second PLMN different than the first PLMN; perform a first registration procedure, using the first USIM based operation, with the first PLMN; perform a second registration procedure, using the second USIM based operation, with the second PLMN; wherein the UE receives information of one or more operation gaps during the first registration procedure, and performs the second registration procedure during at least one of the one or more operation gaps.

In one example, a method of a user equipment (UE), the method comprising: detecting a presence of multiple-universal subscriber identity module (multi-USIM) based operations having at least a first USIM based operation and a second USIM based operation in the UE, the first USIM based operation belonging to a first Public Land Mobile Network (PLMN), the second USIM based operation belonging to a second PLMN different than the first PLMN; performing a first registration procedure, using the first USIM based operation, with the first PLMN; performing a second registration procedure, using the second USIM based operation, with the second PLMN; wherein the UE receives information of one or more operation gaps during the first registration procedure, and performs the second registration procedure during at least one of the one or more operation gaps.

In one example, a communication network comprising: a first Public Land Mobile Network (PLMN) configured to: receive a first registration message in a first multiple-universal subscriber identity module (USIM) based operation of a user equipment (UE), the first registration message comprising an indication of the presence of multi-USIM based operations in the UE and information of the multi-USIM based operations belonging to multiple PLMNs; send a first registration response to the UE, the first registration response comprising the information of one or more operation gaps for registering a second USIM based operation of the UE with a second PLMN, and a network indication of multi-USIM multi-PLMN UE support.

In one example, a method for a communication network having a first Public Land Mobile Network (PLMN) and a second PLMN, the method comprising: receiving, by the first PLMN, a first registration message in a first multiple-universal subscriber identity module (USIM) based operation of a user equipment (UE), the first registration message comprising an indication of the presence of multi-USIM based operations in the UE and information of the multi-USIM based operations belonging to multiple PLMNs; sending, by the first PLMN, a first registration response to the UE, the first registration response comprising the information of the one or more operation gaps for registering a second USIM based operation of the UE with a second PLMN, and a network indication of multi-USIM multi-PLMN UE support.

BRIEF DESCRIPTION OF DRAWINGS

Implementations of the present technology will now be described, by way of example only, with reference to the attached figures.

FIG. 6B is a flowchart diagram illustrating a method of a network for activating a service (e.g., a call and/or data session) with a multi-USIM based operation UE on a second network system while maintaining a network connection with the UE on a first network system by forwarding a paging message to a first USIM based operation in the UE through the first network system, in accordance with example implementations of the present disclosure.

FIG. 8A is a flowchart diagram illustrating a method of a multi-USIM based operation UE for activating a service (e.g., a call and/or data session) on a second network system while maintaining a network connection with a UE on a first network system by scheduling a paging message during a gap interval of a first USIM based operation, in accordance with example implementations of the present disclosure.

DESCRIPTION OF EMBODIMENTS

Figure 1:
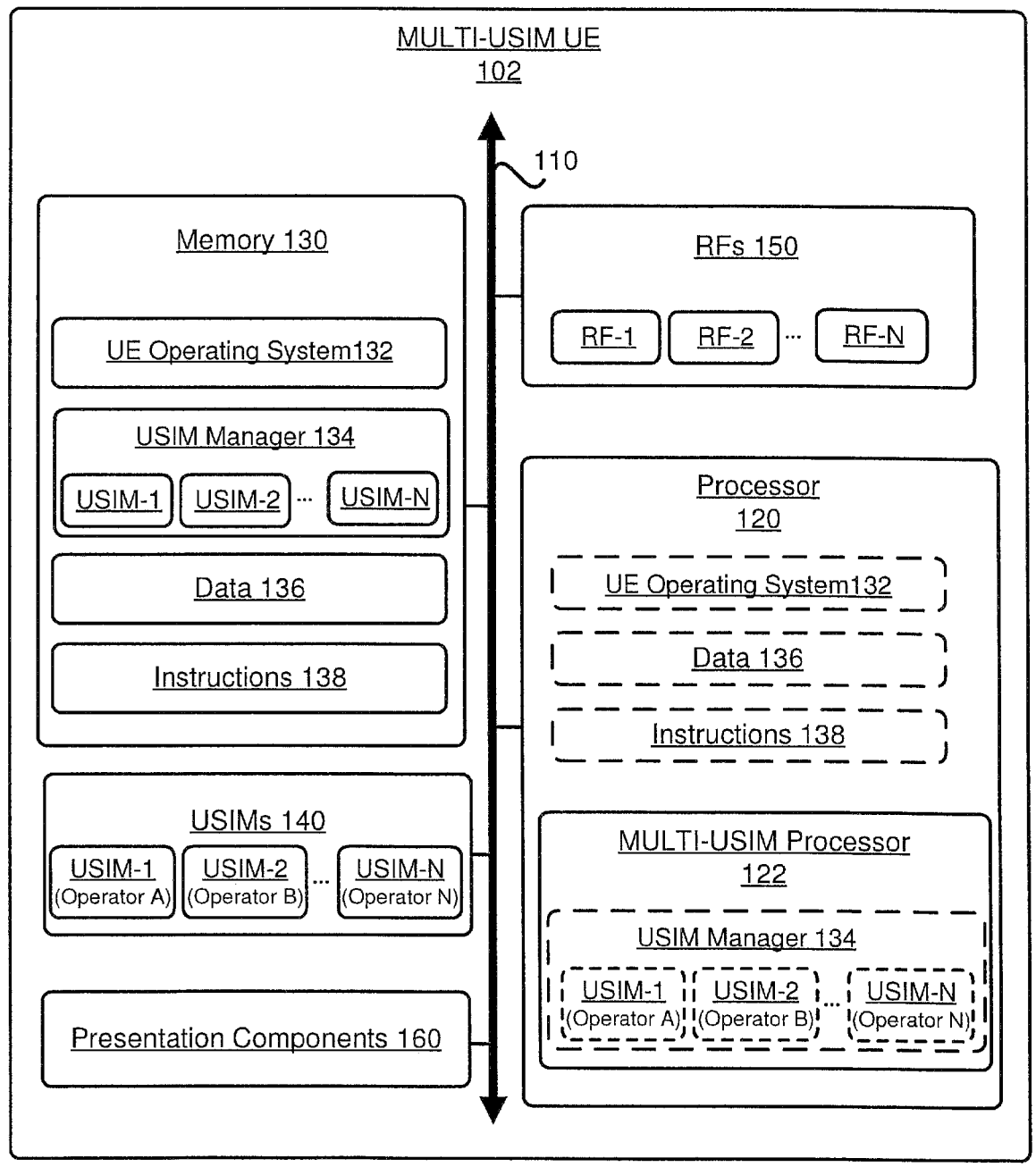
FIG. 1 is a block diagram of a multi-USIM UE supporting different operators, in accordance with various example implementations of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on a UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequences may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram of a multi-USIM UE supporting different operators, in accordance with various example implementations of the present disclosure. As shown in FIG. 1, multi-USIM UE 102 may include processor 120, memory 130, multiple USIMs 140 belonging to different networks/operators, multiple Radio Front-end circuitries (RFs) 150, and one or more presentation components 160. Multi-USIM UE 102 may also include one or more radio frequency spectrum band modules, one or more base station communications modules, one or more network communications modules, and one or more system communications management modules, Input/Output (I/O) ports, I/O components, and power supply (not explicitly shown in FIG. 1). Each of these components may be in communication with each other, directly or indirectly, over one or more buses 110.

In various implementations of the present disclosure, processor 120 (e.g., having processing circuitry) may include an intelligent hardware device, e.g., a Central Processing Unit (CPU), a microcontroller, an ASIC, etc. Processor 120 may also include memory storage. As illustrated in FIG. 1, processor 120 may be responsible for running UE operating system 132, and processing data 136 and instructions 138 received from memory 130, information through RFs 150, the base band communications module, and/or the network communications module. Processor 120 may also process information to be sent to RFs 150 for transmission to the network communications module for transmission to a core network. In the present implementation, processor 120 may include multi-USIM processor 122 for processing instructions from USIM manager 134 for one or more of USIMs of multi-USIM UE 102, for example.

As illustrated in FIG. 1, memory 130 may store UE operating system 132, USIM manager 134, data 136, and computer-readable, computer-executable instructions 138 (e.g., software codes) that are configured to, when executed, cause processor 120 to perform various functions described herein. Alternatively, USIM manager 134 and/or instructions 138 may not be directly executable by processor 120 but be configured to cause multi-USIM UE 102 (e.g., when compiled and executed) to perform various functions described herein.

In various implementations of the present disclosure, memory 130 may include a variety of computer-readable media. Computer-readable media may be any available media that may be accessed by multi-USIM UE 102 and include both volatile and non-volatile media, and/or removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various implementation of the present disclosure, memory 130 may include computer-storage media in the form of volatile and/or non-volatile memory. Memory 130 may be removable, non-removable, or a combination thereof. Example memory includes solid-state memory, hard drives, optical-disc drives, etc.

As illustrated in FIG. 1, multi-USIM UE 102 may include multiple USIMs 140, such as USIM-1, USIM-2, through USIM-N. USIM-1, USIM-2, through USIM-N may belong to the same or different network/operator (e.g., Public Land Mobile Network (PLMN)). For example, USIM-1, USIM-2, through USIM-N may belong to Operator A, Operator B, through Operator N, respectively. It should be noted that, although USIMs are described in the present implementation and various implementations of the present disclosure, other subscriber identity modules or subscriber identification modules (e.g., SIMs) can also be used.

As shown in FIG. 1, multi-USIM UE 102 may include multiple RFs 150, such as RF-1, RF-2, through RF-N. Each of the RFs 150 may include a transmitter (e.g., transmitting/transmission circuitry) and a receiver (e.g., receiving/reception circuitry). In some implementations of the present disclosure, RF-1, RF-2, through RF-N of RFs 150 may respectively correspond to USIM-1, USIM-2, through USIM-N, where USIM-1, USIM-2, through USIM-N may transmit and/or receive data and control channels, for example, through RF-1, RF-2, through RF-N, respectively.

As shown in FIG. 1, multi-USIM UE 102 may include presentation components 160 for presenting data indications to a person or other device. Examples of presentation components 160 may include a display device, speaker, printing component, vibrating component, etc.

Figure 2:
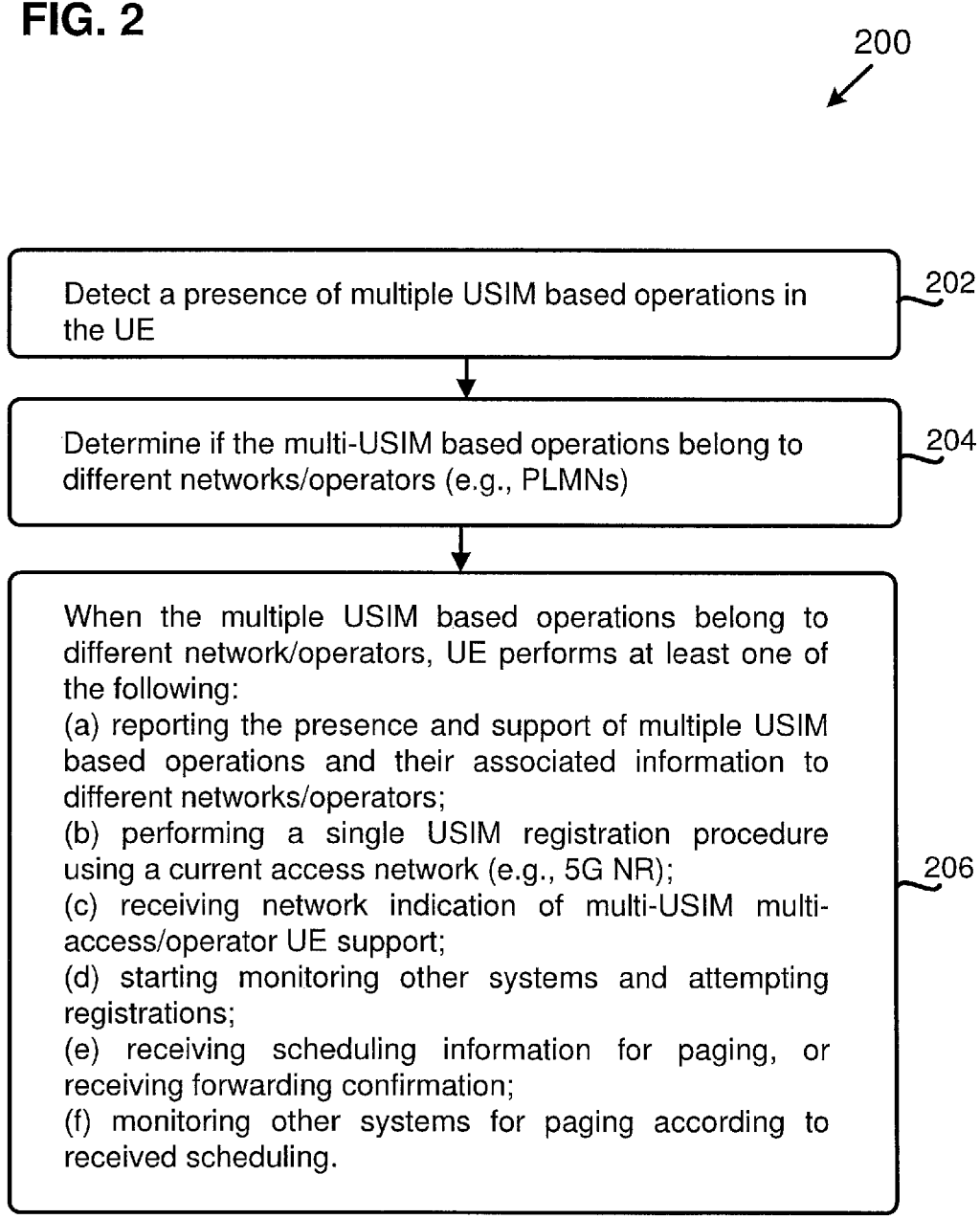
FIG. 2 is a flowchart diagram illustrating a method of a UE for performing multi-USIM registrations in different communication networks, in accordance with example implementations of the present disclosure.

FIG. 2 is a flowchart diagram illustrating a method of implementing a UE for performing multi-USIM registrations in different communication networks, in accordance with example implementations of the present disclosure. As illustrated in FIG. 2, flowchart 200 may include actions 202, 204, and 206. In one implementation, the UE described in flowchart 200 may correspond to multi-USIM UE 102 in FIG. 1.

In action 202, the UE may detect a presence of multiple USIM based operations in the UE. In one implementation, before the UE is powered on, two or more USIMs are inserted into the USIM card slots of the UE, for example. When the UE is powered on, the UE (e.g., through multi-USIM processor 122 and USIM manager 134 in FIG. 1) may detect the presence of the multiple USIM based operations. In another implementation, the UE is initially powered on with a first USIM based operation, and a second USIM based operation is later inserted into the UE. The UE (e.g., through multi-USIM processor 122 and USIM manager 134 in FIG. 1) may detect the second USIM based operation while the UE is operating with the first USIM based operation already registered with the current network.

In action 204, the UE may determine if the multi-USIM based operations belong to different networks/operators. In one implementation, the UE may check the operator IDs (e.g., PLMN IDs) associated with the USIM based operations in the UE to determine if the multi-USIM based operations belong to different networks/operators. For example, when the PLMN IDs of the USIM based operations are different, then the multiple USIM based operations belong to different networks/operators.

In action 206, when the multi-USIM based operations belong to different networks/WO operators, the UE may report the presence and support of multi-USIM based operations and their associated information to the networks/operators. The UE may perform a single USIM registration procedure using a current (or preferred) access network (e.g., 5G NR). The UE may receive a network indication of multi-USIM and multi-access/operator (e.g., PLMN) UE support. The UE may start monitoring other systems and attempt registrations. The UE may receive scheduling information for paging or receiving forwarding confirmation. The UE may also monitor other systems for paging according to received scheduling.

Figure 3:
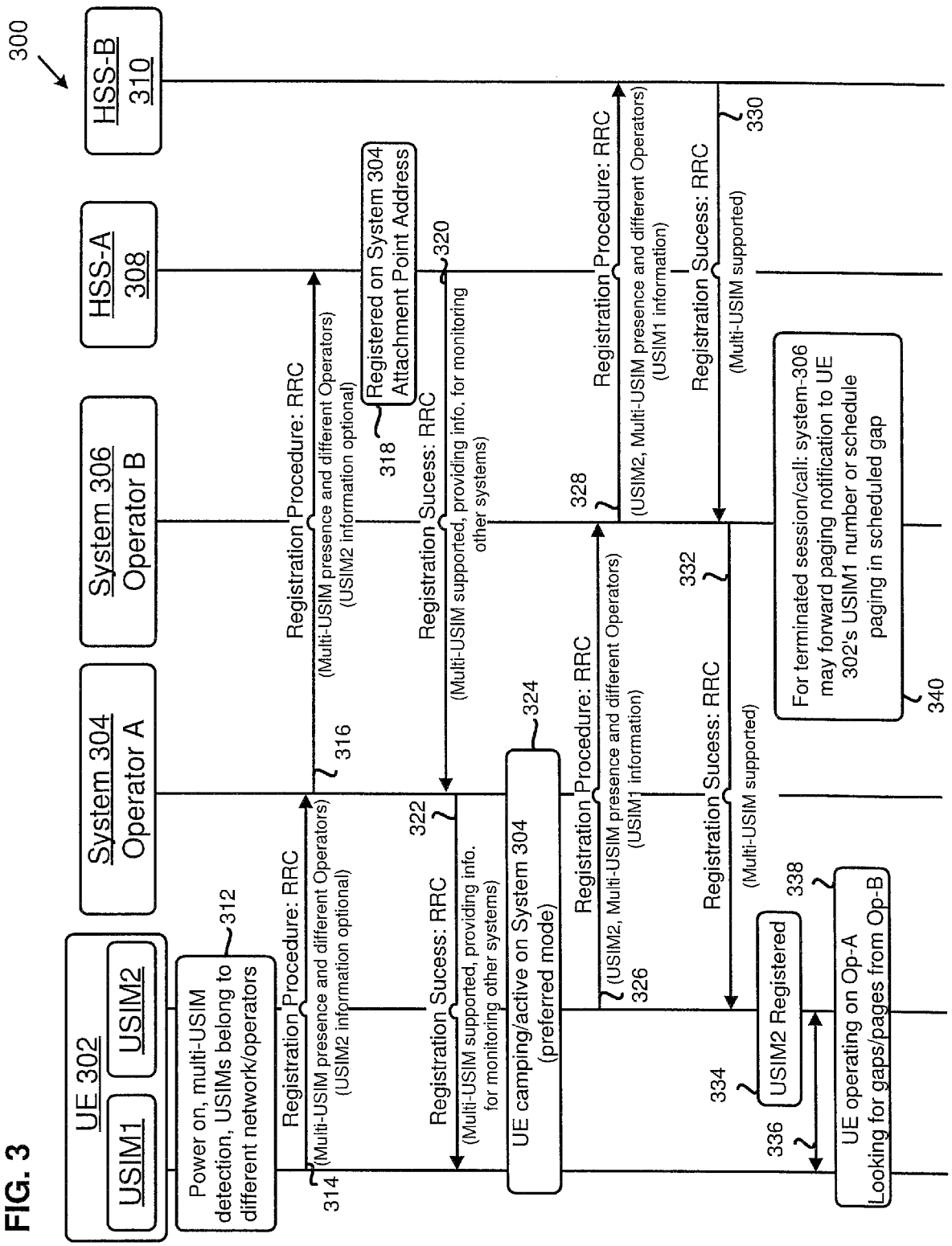
FIG. 3 is a signaling sequence diagram for schematically illustrating a method of registering the presence of multi-USIM based operations in a UE and capabilities of the multi-USIM based operations belonging to different wireless communication networks through multiple access registration procedures, in accordance with example implementations of the present disclosure.

FIG. 3 is a signaling sequence diagram for schematically illustrating a method of registering the presence of multi-USIM based operations in a UE and capabilities of the multi-USIM based operations belonging to different wireless communication networks through multiple access registration procedures, in accordance with example implementations of the present disclosure.

As shown in FIG. 3, in diagram 300, UE 302 may report or register the presence and capabilities of multi-USIM based operations to Home Subscriber Server (HSS) 308 and HSS 310 respectively through system 304 and system 306, for example, through one or more of actions 312, 314, 316, 318, 320, 322, 324, 326, 328, 330, 332, 334, 336, 338, and 340. In one implementation, UE 302 described in diagram 300 may correspond to multi-USIM UE 102 in FIG. 1. It should be noted that, in diagram 300, although UE 302 is shown to include two USIM based operations (USIM1 and USIM2 based operations), UE 302 may include and support more than two USIM based operations.

In action 312, UE 302 may be powered on. For example, UE 302 is turned on by a user. UE 302 may detect a presence of multiple USIMs, and multi-USIM based operations. For example, when UE 302 is powered on, UE 302 (e.g., through multi-USIM processor 122 and USIM manager 134 in FIG. 1) may detect the presence of more than one USIM. In the present implementation, before UE 302 is powered on, USIM1 and USIM2 are inserted into the USIM card slots of UE 302, for example. Thus, upon being powered on, UE 302 detects the presence of both USIM and USIM2 based operations. UE 302 may further determine if USIM1 and USIM2 based operations belong to different networks/operators (e.g., systems 304 and 306 (operator/PLMN A and operator/PLMN B) in FIG. 3). In one implementation, UE 302 may check the operator IDs (e.g., PLMN IDs) associated with USIM1 and USIM2 based operations to determine if the operator IDs are different. For example, each operator ID may include a mobile country code (MCC) and a mobile network code (MNC). When the MCC and MNC of USIM1 based operations do not match those of USIM2 based operations, then UE 302 determines that USIM1 based operations and USIM2 based operations respectively belong to different networks/operators (e.g., system 304 (first PLMN) and system 306 (second PLMN)).

In action 314, UE 302 may perform a first registration procedure, using USIM1 based operations, with system 304 (e.g., a first PLMN). In one implementation, USIM1 based operations may be preferred over USIM2 based operations, for example, based on reference signal received power (RSRP), network condition, etc. In action 314, UE 302 may send a first registration message (e.g., through RRC signaling) to system 304 through USIM1 based operations. The first registration message may include an indication of the presence of multi-USIM based operations in UE 302 and information of the multi-USIM based operations belonging to systems 304 and 306 (e.g., operated under different PLMNs). The first registration message may also include the associated capabilities of USIM1 based operations belonging to system 304. The first registration message may optionally include the associated capabilities of USIM2 based operations belonging to system 306. For example, in addition to the typical USIM related information (e.g., USIM1 based operation related information), the first registration message may include USIM2 based operation related information (e.g., phone number, PLMN ID, international mobile subscriber identity (IMSI), International Mobile Equipment Identity (IMEI), Temporary Mobile Subscriber Identity (TMSI), etc.) and the associated capabilities (e.g., NAS and/or AS capabilities) of USIM2.

In action 316, system 304 may send the first registration message (e.g., through RRC signaling) having the indication of the presence of multi-USIM based operations and the associated capabilities of USIM1 (and optionally USIM2) based operations to HSS 308 through the first registration procedure.

In action 318, HSS 308 may successfully register USIM1 related operations and the associated capabilities of USIM1 based operations. HSS 308 may optionally store information associated with USIM2 based operations. HSS 308 may also assign an attachment point address for UE 302 in system 304.

In action 320, HSS 308 may send a first registration response to system 304. In one implementation, the first registration response may include information of one or more operation gaps (e.g., gap intervals during which USIM1 based operations need not take measurements of system 304) for registering USIM2 based operations with system 306 and a network indication of the multi-USIM multi-PLMN support for UE 302. In one implementation, the first registration response may provide the associated information and capabilities of USIM1 and USIM2 based operations for monitoring other systems. In another implementation, the first registration response may also indicate support of other network notification forwarding services.

In action 322, system 304 may send the first registration response to UE 302 through USIM1 based operations.

In action 324, USIM1 is registered with system 304 and HSS 308. UE 302 may camp (and be active) on system 304, which is the preferred mode (e.g., PLMN).

It should be noted that actions 312 through 324 are performed using USIM1 based operations with system 304.

In action 326, UE 302 may perform a second registration procedure, using USIM2 based operations, with system 306 (e.g., a second PLMN). In action 326, UE 302 may send a second registration message (e.g., through RRC signaling) to system 306 through USIM2 based operations. The second registration message may be sent to system 306 during at least one of the one or more operation gaps associated with USIM1 based operations. The second registration message may include an indication of the presence of the multi-USIM based operations in UE 302 and information of the multi-USIM based operations belonging to systems 304 and 306 (e.g., operated under different PLMNs). The second registration message may also include the associated capabilities of USIM2 based operations belonging to system 306. The second registration message may optionally include the associated capabilities of USIM1 based operations belonging to system 304. For example, in addition to the typical USIM related information (e.g., USIM2 based operation related information), the second registration message may also include USIM1 based operation related information (e.g., phone number, PLMN ID, international mobile subscriber identity (IMSI), International Mobile Equipment Identity (IMEI), Temporary Mobile Subscriber Identity (TMSI), etc.) and the associated capabilities (e.g., NAS and/or AS capabilities) of USIM1. In another implementation, the second registration message may include a request to activate a notification forwarding service to USIM1 based operations, where all or part of UE notifications are to be forwarded to at least one of the first PLMN and a phone number associated with USIM1 based operations.

In action 328, system 306 may send the second registration message (e.g., through RRC signaling) having the indication of the presence multi-USIM based operation presence and the associated capabilities of USIM2 (and optionally USIM1) based operations to HSS 310 through the second registration procedure.

In action 330, HSS 310 may send a second registration response to system 306. In one implementation, the second registration response may include a network indication of the multi-USIM multi-PLMN support for UE 302.

In action 332, system 306 may send the second registration response to USIM2 through USIM2 based operations.

In action 334, USIM2 is registered with system 306 and HSS 310.

In action 336, USIM2 may communicate with USIM1 (e.g., through USIM manager 134) to inform each other that both USIM1 that USIM2 are successfully registered with their respective system 304 and system 306.

In action 338, UE 302 may operate on system 304, and look for paging messages from system 306 during one or more scheduled operation gaps (e.g., gap intervals) associated with USIM1 based operations.

In action 340, for terminated sessions/calls, system 306 may forward paging notification to UE 302 through USIM1 based operations or schedule paging during one or more scheduled operation gaps.

It should be noted that during the registration procedures for the multi-USIM based operations, authentication procedures may also be implemented and the success of authentication for the multi-USIM based operations belonging to the multi-PLMNs may also be necessary to complete the registration of the multi-USIM based operations. The details of the authentication procedures are omitted for brevity.

Figure 4A:
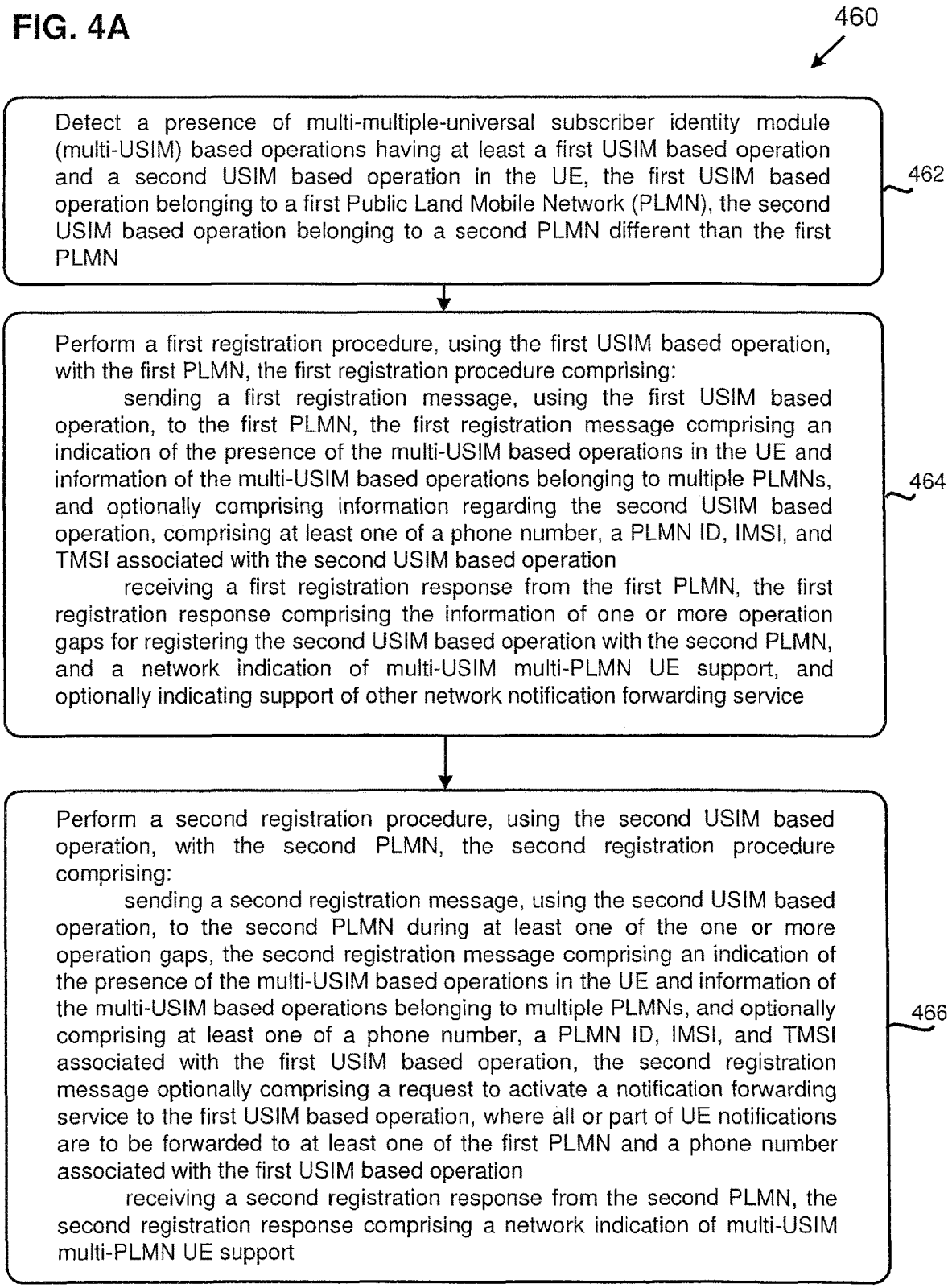
FIG. 4A is a flowchart diagram illustrating a method of a multi-USIM based operation UE for multi-USIM registrations in multiple wireless communication networks through multiple access registration procedures, in accordance with example implementations of the present disclosure.

FIG. 4A is a flowchart diagram illustrating a method of implementing a UE for multi-USIM registrations in multiple wireless communication networks through multiple access registration procedures, in accordance with example implementations of the present disclosure. As illustrated in FIG. 4A, flowchart 460 may include actions 462, 464, and 466. In the present implementation, the UE may correspond to UE 302 supporting multi-USIM based operations in FIG. 3.

In action 462, the UE may detect a presence of multiple USIM based operations in the UE. With reference to FIG. 3, before UE 302 is powered on, USIM1 and USIM2 are inserted into the USIM card slots of UE 302, for example. When UE 302 is powered on, UE 302 (e.g., through multi-USIM processor 122 and USIM manager 134 in FIG. 1) may detect the presence of USIM1 and USIM2 based operations (e.g., action 312 in FIG. 3). UE 302 may further determine that USIM1 and USIM2 based operations belong to different networks/operators, for example, when the operator IDs (e.g., PLMN IDs) of USIM1 and USIM2 based operations do not match (e.g., action 312 in FIG. 3).

In action 464, the UE may perform a first registration procedure, using the first USIM based operation, with the first PLMN. The first registration procedure may include sending a first registration message, using the first USIM based operation, to the first PLMN, the first registration message comprising an indication of the presence of the multi-USIM based operations in the UE and information of the multi-USIM based operations belonging to multiple PLMNs, and optionally comprising information regarding the second USIM based operation, comprising at least one of a phone number, a PLMN ID, IMSI, and TMSI associated with the second USIM based operation. The first registration procedure may also include receiving a first registration response from the first PLMN, the first registration response comprising the information of one or more operation gaps for registering the second USIM based operation with the second PLMN, and a network indication of multi-USIM multi-PLMN UE support, and optionally indicating support of other network notification forwarding service.

For example, in action 464, UE 302 may perform the first registration procedure, using USIM1 based operations, with system 304 (e.g., the first PLMN). The first registration message may include an indication of the presence of the multi-USIM based operations in UE 302 and information of the multi-USIM based operations belonging to systems 304 and 306. In addition to the typical USIM related information (e.g., USIM1 based operation related information), the first registration message may also include USIM2 based operation related information (e.g., phone number, PLMN ID, international mobile subscriber identity (IMSI), International Mobile Equipment Identity (IMEI), Temporary Mobile Subscriber Identity (TMSI), etc.) and the associated capabilities (e.g., NAS and/or AS capabilities) associated with USIM2.

In action 464, UE 302 may further receive a first registration response from system 304. In one implementation, the first registration response may include information of one or more operation gaps for registering USIM2 based operations with system 306 and a network indication of the multi-USIM multi-PLMN support for UE 302. In one implementation, the first registration response may provide the associated information and capabilities of USIM1 and USIM2 based operations for monitoring other systems. In another implementation, the first registration response may also indicate support of other network notification forwarding service.

In action 466, the UE may perform a second registration procedure, using the second USIM based operation, with the second PLMN. The second registration procedure may include sending a second registration message, using the second USIM based operation, to the second PLMN during at least one of the one or more operation gaps, the second registration message comprising an indication of the presence of the multi-USIM based operations in the UE and information of the multi-USIM based operations belonging to multiple PLMNs, and optionally comprising at least one of a phone number, a PLMN ID, IMSI, and TMSI associated with the first USIM based operation, the second registration message optionally comprising a request to activate a notification forwarding service to the first USIM based operation, where all or part of UE notifications are to be forwarded to at least one of the first PLMN and a phone number associated with the first USIM based operation. The second registration procedure may also include receiving a second registration response from the second PLMN, the second registration response comprising a network indication of multi-USIM multi-PLMN UE support.

For example, in action 466, UE 302 may perform the second registration procedure, using USIM2 based operations, with system 306 (e.g., the second PLMN). The second registration message may be sent to system 306 during at least one of the one or more operation gaps associated with USIM1 based operations. The second registration message may include an indication of the presence of the multi-USIM based operations in UE 302 and information of the multi-USIM based operations belonging to systems 304 and 306 (e.g., operated under different PLMNs). In addition to the typical USIM related information (e.g., USIM2 based operation related information), the second registration message may also include USIM1 based operation related information (e.g., phone number, PLMN ID, international mobile subscriber identity (IMSI), International Mobile Equipment Identity (IMEI), Temporary Mobile Subscriber Identity (TMSI), etc.) and the associated capabilities (e.g., NAS and/or AS capabilities). In another implementation, the second registration message may include a request to activate a notification forwarding service to USIM1 based operations, where all or part of UE notifications are to be forwarded to at least one of the first PLMN and a phone number associated with USIM1 based operations.

In action 466, UE 302 may further receive a second registration response from system 306. In one implementation, the second registration response may include a network indication of multi-USIM multi-PLMN UE support for UE 302.

Figure 4B:
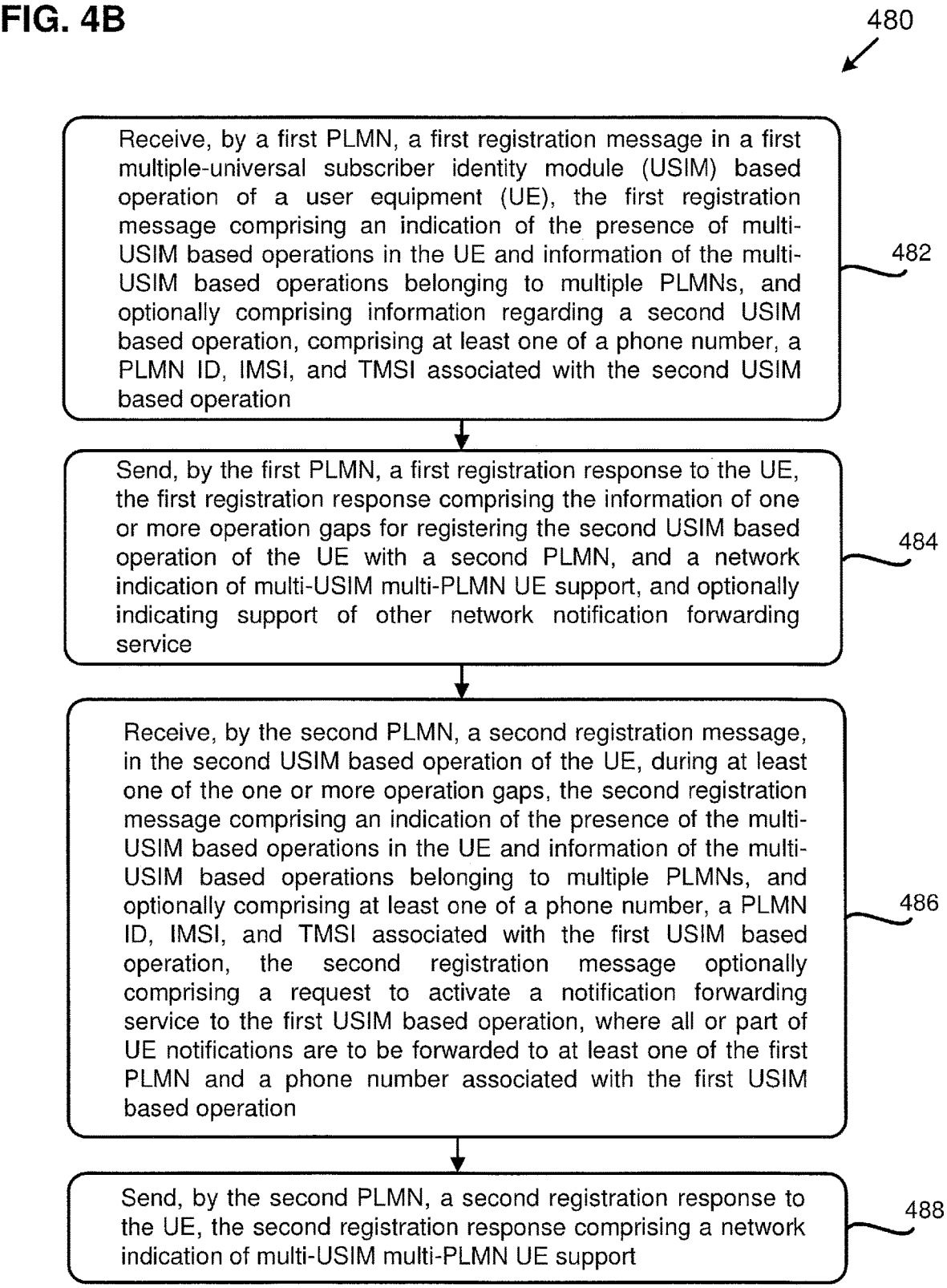
FIG. 4B is a flowchart diagram illustrating a method of multiple networks for registering multiple USIM based operations and associated capabilities from a multi-USIM based operation UE through multiple access registration procedures, in accordance with example implementations of the present disclosure.

FIG. 4B is a flowchart diagram illustrating a method of implementing multiple networks for registering multiple USIM based operations and associated capabilities from a multi-USIM based operation UE through multiple access registration procedures, in accordance with example implementations of the present disclosure. As illustrated in FIG. 4B, flowchart 480 may include actions 482, 484, 486, and 488. In the present implementation, the network may include, but is not limited to, systems 304 and 306, and HSSs 308 and 310 in FIG. 3.

In action 482, the first PLMN may receive a first registration message in a first multiple-universal subscriber identity module (USIM) based operation of a user equipment (UE), the first registration message comprising an indication of the presence of multi-USIM based operations in the UE and information of the multi-USIM based operations belonging to multiple PLMNs, and optionally comprising information regarding a second USIM based operation, comprising at least one of a phone number, a PLMN ID, IMSI, and TMSI associated with the second USIM based operation. With reference to FIG. 3, system 304 may receive the first registration message that indicates the presence of USIM1 and USIM2 based operations in UE 302 and the capabilities associated with USIM1 and USIM2 based operations (e.g., action 314 in FIG. 3). In addition to USIM1 based operation related information (e.g., phone number, IMSI, IMEI, TMSI, etc.), the first registration message may also include USIM2 based operation related information (e.g., phone number, IMSI, IMEI, TMSI, etc.) and the associated capabilities (e.g., NAS and/or AS capabilities) of each of USIM1 and USIM2 based operations.

In action 484, the first PLMN may send a first registration response to the UE, the first registration response including the information of one or more operation gaps for registering a second USIM based operation of the UE with a second PLMN, and a network indication of multi-USIM multi-PLMN UE support. For example, in FIG. 3, system 304 (e.g., the first PLMN) may send a first registration response to UE 302 (e.g., action 324 in FIG. 3). The first registration response may include the information of one or more operation gaps for registering USIM2 based operations of UE 302 with system 306 (e.g., the second PLMN), and a network indication of multi-USIM multi-PLMN UE support. In action 484, the first registration response may further indicate support of other network notification forwarding service.

In action 486, the second PLMN may receive a second registration message in a second USIM based operation of the UE, during at least one of the one or more operation gaps, the second registration message may include an indication of the presence of the multi-USIM based operations in the UE and information of the multi-USIM based operations belonging to multiple PLMNs. With reference to FIG. 3, system 306 may receive the second registration message that indicates the presence of USIM1 and USIM2 based operations in UE 302 and the capabilities associated with USIM1 and USIM2 based operations (e.g., action 326 in FIG. 3). In addition to USIM2 based operation related information (e.g., phone number, IMSI, IMEI, TMSI, etc.), the second registration message may also include USIM1 based operation related information (e.g., phone number, IMSI, IMEI, TMSI, etc.) and the associated capabilities (e.g., NAS and/or AS capabilities) of each of USIM1 and USIM2 based operations. In action 486, the second registration message may further include a request to activate a notification forwarding service to USIM1 based operation, where all or part of UE notifications are to be forwarded to at least one of system 304 and a phone number associated with USIM1 based operation.

In action 488, the second PLMN may send a second registration response to the UE, the second registration response may include a network indication of multi-USIM multi-PLMN UE support. For example, in FIG. 3, system 306 may send a second registration response to UE 302 (e.g., action 332 in FIG. 3).

The method illustrated in FIG. 3 (along with FIGS. 4A and 4B) allows a UE to report its multi-USIM based operational capabilities, presence of two or more USIM based operations belonging to different networks/operators, and capabilities of simultaneous connections to the networks and indicate its network preference/priority list through an access registration procedure or a registration update procedure using one of the USIM based operations. In addition, the method illustrated in diagram 300 allows the handling of service prioritization and specifying the UE behavior upon reception of paging information based on USIM configuration and/or user preferences.

Figure 5:
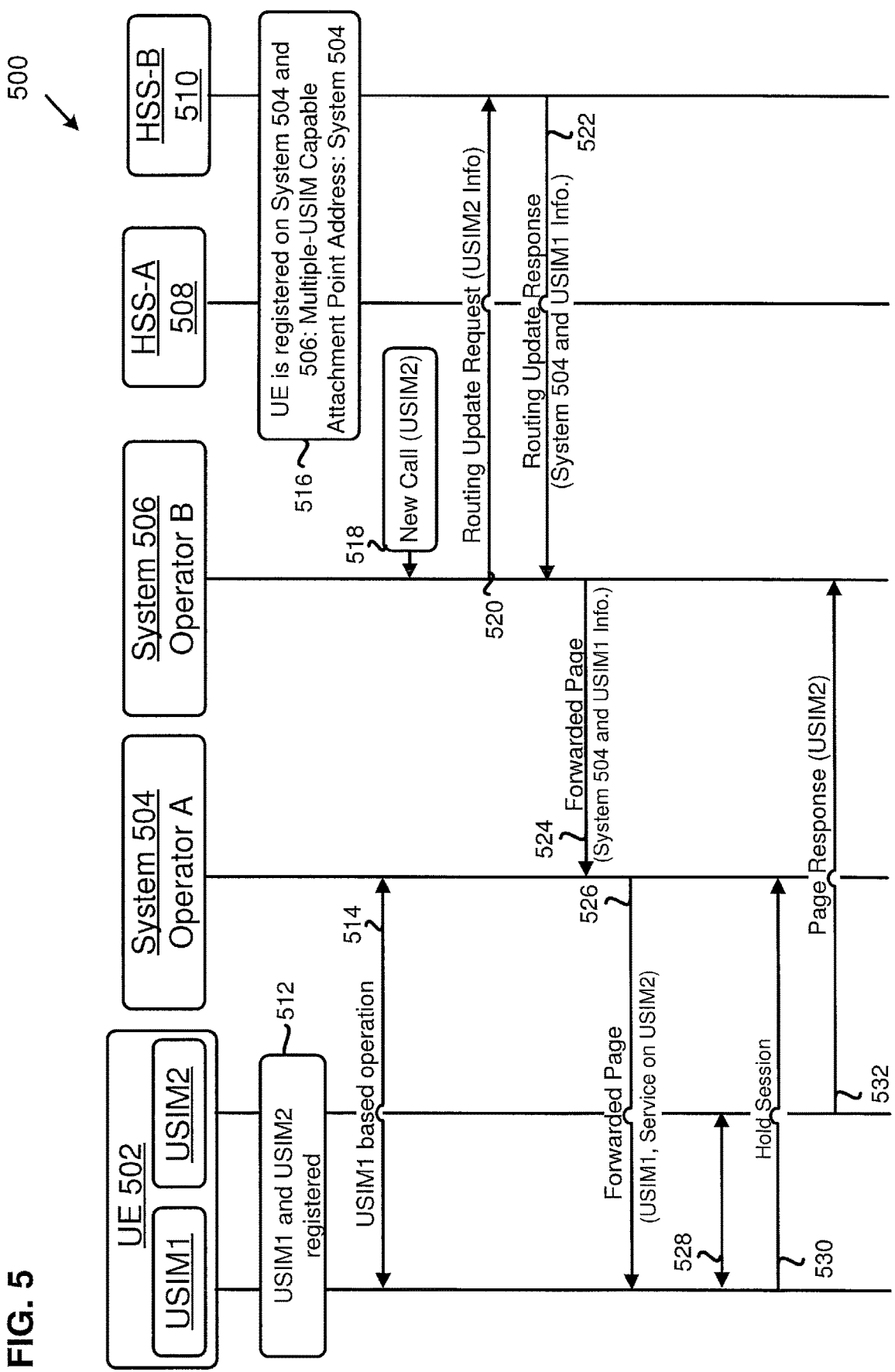
FIG. 5 is a signaling sequence diagram for schematically illustrating a method of delivering a service (e.g., a call and/or data session) from a second access network system to a multi-USIM based operation UE, while the UE is camping on a first access network system, in accordance with example implementations of the present disclosure.

FIG. 5 is a signaling sequence diagram for schematically illustrating a method of delivering a service (e.g., a call and/or data session) from a second access network system to a multi-USIM based operation UE, while the UE is camping on a first access network system, in accordance with example implementations of the present disclosure.

In the present implementation, as shown in diagram 500 of FIG. 5, after the registrations on system 504 and system 506 are successful for USIM1 and USIM2 based operations in UE 502, UE 502 may be paged on the first access network system (e.g. first PLMN) for a call received on the second access network system (e.g. second PLMN), for example, through one or more of actions 512, 514, 516, 518, 520, 522, 524, 526, 528, 530, and 532. In one implementation, UE 502 described in diagram 500 may correspond to multi-USIM UE 102 in FIG. 1 and/or multi-USIM UE 302 in FIG. 3.

In action 512, USIM1 of UE 502 is registered with system 504, and USIM2 of UE 502 is registered with system 506. For example, after successfully performing the registration procedures for the multi-USIM based operations (e.g., the first and second USIM based operations), both USIMs 1 and 2 are registered with their corresponding networks. In one implementation, action 512 may come after action 338 in FIG. 3.

During the registration procedures for the multi-USIM based operations, authentication procedures may also be implemented and the success of authentication for the multi-USIM based operations belonging to the multi-PLMNs may also be necessary to complete the registration of the multi-USIM based operations.

In action 514, UE 502 may camp and/or be active on system 504 (e.g., operator/PLMN A) using USIM1 based operations, where system 504 is the preferred access network system. In action 516, UE 502 is registered on system 504 and system 506 as a multi-USIM multi-PLMN supported UE. Systems 504 and 506 may both store capabilities of USIM1 and USIM2. HSS 508 and HSS 510 may store an assigned attachment point address for UE 502 in system 504.

In action 518, a new service (e.g., a call and/or data session) may be requested on system 506 for USIM2 based operation of UE 502. In one implementation, the call may be a circuit switched voice call. In another implementation, the call may be a voice call in a voice over internet protocol (VoIP) format. In yet another implementation, the call may include a voice component and/or a media component with their respective attributes. For example, the call may include IP multimedia core network subsystem (IMS) session content having voice call content in IMS domain and multimedia content in IMS domain.

In action 520, system 506 may send a routing update request to HSS 510 to find a routing path for the call to UE 502. The routing update request may include information regarding USIM2 based operations.

In action 522, HSS 510 may send a routing update response to system 506, where the routing update response may include information regarding system 504 and USIM1 based operations of UE 502.

In action 524, system 506 may forward a paging message to the system 504. The paging message to the system 504 may include information regarding system 504 and USIM1 based operation.

In action 526, system 504 may forward a paging message to USIM1 through USIM1 based operations. The paging message to USIM1 may include information regarding USIM1 based operations and the service (e.g., an active call and/or data session) to USIM2 for USIM2 based operations of UE 502.

In action 528, a USIM manager (e.g., USIM manager 134 in FIG. 1) may convey the paging message from USIM1 to USIM2 of UE 502, for example, through tunneling.

In action 530, UE 502 may send a hold message (e.g., an RRC-AS/NAS message) to system 504 using USIM1 based operations and the RF circuitry associated with USIM1 (e.g., RF1 in FIG. 1) to put a service (e.g., an active call and/or data session) between USIM1 based operations of UE 502 and system 504 on hold.

In action 532, upon putting the service (e.g., an active call and/or data session) between USIM1 based operations of UE 502 and system 504 on hold, USIM2 of UE 502 may send a paging response to system 506 to activate the service with UE 502 using USIM2 based operations, while the service between USIM1 based operations and system 504 is on hold.

In some implementations, after the service between USIM2 and system 506, UE 502 may revert back to system 504 to resume the service between USIM1 based operations and system 504. In some implementations, after the service between USIM2 and system 506, UE 502 may stay in system 506 and end the service between USIM1 based operations and system 504. In some implementations, after receiving the forwarded paging message from system 504, USIM2 may first put a hold on the service between USIM2 and system 506, revert back to and finish the service between USIM1 and system 504, before resuming the service between USIM2 and system 506.

Figure 6A:
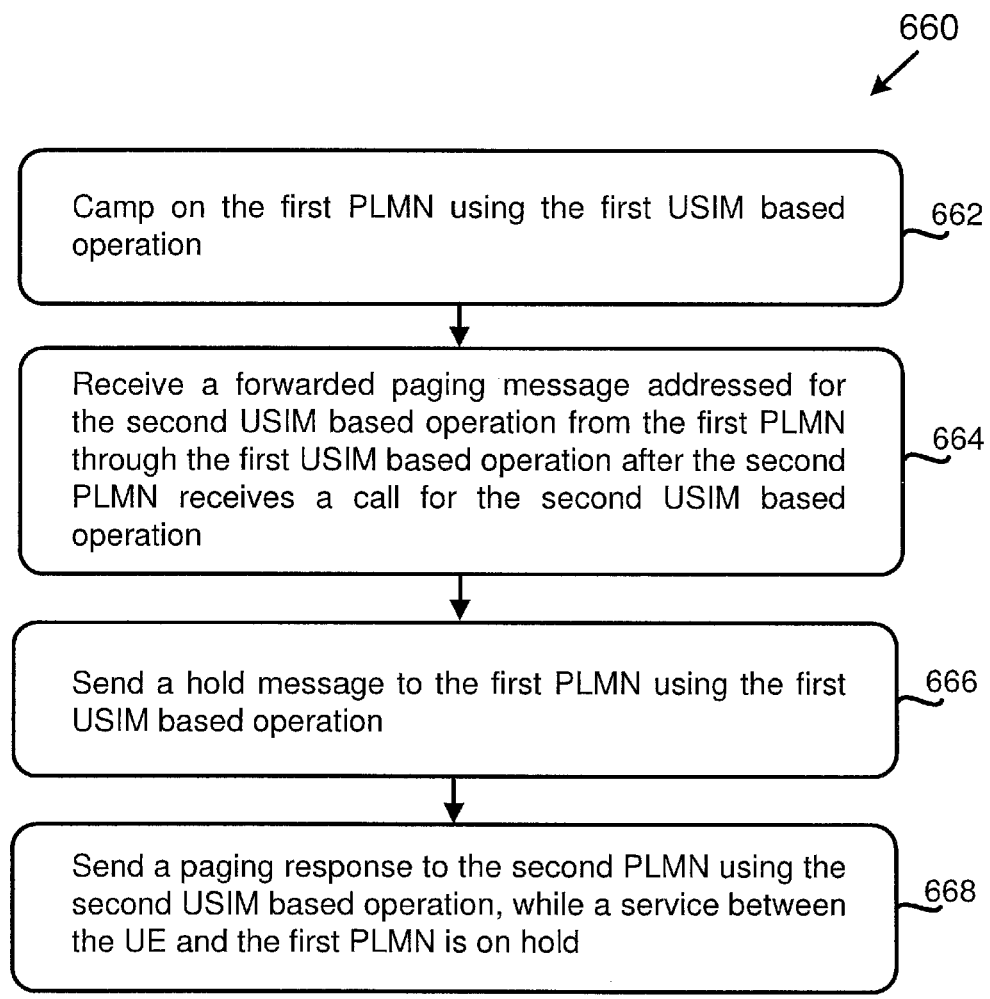
FIG. 6A is a flowchart diagram illustrating a method of a multi-USIM based operation UE for activating a service (e.g., a call and/or data session) on a second network system while maintaining a network connection with the UE on a first network system by receiving a paging message through the first network system using a first USIM based operation, in accordance with example implementations of the present disclosure.

FIG. 6A is a flowchart diagram illustrating a method of implementing a multi-USIM based operation UE for activating a service (e.g., a call and/or data session) on a second network system while maintaining a network connection with a UE on a first network system by receiving a paging message through the first network system using a first USIM based operation, in accordance with example implementations of the present disclosure. As illustrated in FIG. 6A, flowchart 660 may include actions 662, 664, 666, and 668. In the present implementation, the UE may correspond to UE 502 supporting multi-USIM based operations in FIG. 5.

In action 662, the UE may camp on the first PLMN using the first USIM based operations. For example, in action 514 in FIG. 5, UE 502 may camp on the system 504 using USIM1 based operations of UE 502.

In action 664, the UE may receive a forwarded paging message addressed for the second USIM based operation from the first PLMN through the first USIM based operation after the second PLMN receives a call for the second USIM based operation. For example, in action 526 of FIG. 5, UE 502 may receive a forwarded paging message addressed for USIM2 based operations from system 504 through USIM1 based operations after system 506 receives the call for USIM2 based operations of UE 502.

In action 666, the UE may send a hold message to the first PLMN using the first USIM based operation. For example, in action 530 in FIG. 5, UE 502 may send a hold message to the system 504 using USIM1 based operations of UE 502.

In action 668, the UE may send a paging response to the second PLMN using the second USIM based operation, while a service between the UE and the first PLMN is on hold. For example, in action 532 of FIG. 5, UE 502 may send a paging response to system 506 using USIM2 based operations of UE 502, while the service between USIM1 based operations and system 504 is on hold.

FIG. 6B is a flowchart diagram illustrating a method of implementing a network for activating a service (e.g., a call and/or data session) on a second network system while maintaining a network connection with a multi-USIM based operation UE on a first network system by forwarding a paging message to a first USIM based operation in the UE through the first network system, in accordance with example implementations of the present disclosure. As illustrated in FIG. 6B, flowchart 680 may include actions 682, 684, 686, and 688. In the present implementation, the UE may correspond to UE 502 supporting multi-USIM based operations in FIG. 5.

In action 682, the second PLMN may send a routing request to a second HSS after the second PLMN receives a call for the second USIM based operation, while the UE is camping on the first PLMN using the first USIM based operation. For example, in action 520 of FIG. 5, system 506 may send a routing request to HSS 510 after system 506 receives the call for USIM2 based operations of UE 502, while UE 502 is camping on system 504 using USIM1 based operations.

In action 684, the second PLMN may receive a routing response from the second HSS. The routing response may include information associated with the first PLMN and the first USIM based operation of the UE. For example, in action 522 of FIG. 5, system 506 may receive a routing response from HSS 510. The routing response may include information associated with system 504 and USIM1 based operations of UE 502.

In action 686, the second PLMN may send a forward paging message to the first PLMN based on the routing response. The first PLMN may send the forward paging message to the first USIM based operation of the UE. For example, in action 524 of FIG. 5, system 506 may send a forwarded paging message to system 504 based on the routing response. System 504 may send the forwarded paging message to USIM1 through USIM1 based operations of UE 502.

In action 688, the second PLMN may receive a paging response from the second USIM based operation. For example, in action 532 of FIG. 5, system 506 may receive a paging response from USIM2 though USIM2 based operations of UE 502.

Figure 7:
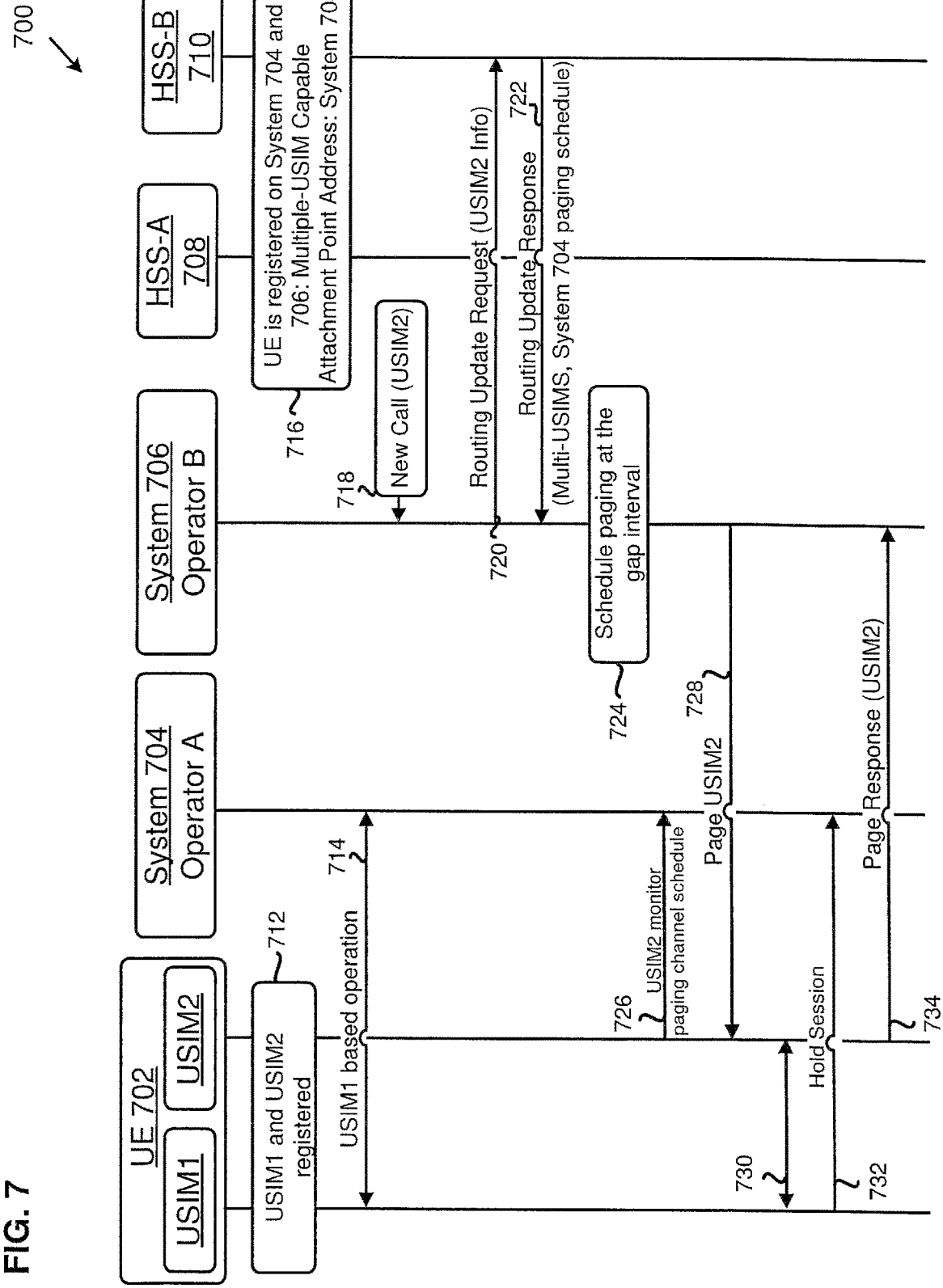
FIG. 7 is a signaling sequence diagram for schematically illustrating a method of delivering a service on a second access network system to a multi-USIM based operation UE, while the UE is camping on a first access network system, in accordance with example implementations of the present disclosure.

FIG. 7 is a signaling sequence diagram for schematically illustrating a method of delivering a service on a second access network system to a multi-USIM based operation UE, while the UE is camping on a first access network system, in accordance with example implementations of the present disclosure.

As shown in FIG. 7, in diagram 700, UE 702 may include USIM1 and USIM2, where USIM1 is configured to system 704 (e.g., a PLMN configured for a 5G NR Internet Protocol (IP) network system), and USIM2 is configured to system 706 (e.g., a PLMN configured a Long-Term Evolution (LTE) network or a Universal Mobile Telecommunications Service (UMTS) Terrestrial Radio Access Network (UTRAN) IP network system). Systems 704 and 706 are communicatively coupled to HSSs 708 and 710, respectively. In one implementation, UE 702 described in diagram 700 may correspond to multi-USIM UE 102 in FIG. 1 and/or multi-USIM UE 302 in FIG. 3.

In present example implementation, diagram 700 illustrates a method of delivering a service on system 706 to UE 702, while UE 702 is camping on system 704, through at least one of actions 712, 714, 716, 718, 720, 722, 724, 726, 728, 730, 732, and 734.

In the present implementation actions 712, 714, 716, and 718 of diagram 700 may be substantially similar to actions 512, 514, 516, and 518 of diagram 500, respectively, the details of which are omitted for brevity.

In action 718, a new call may be requested on system 706 for USIM2 based operation of UE 702. In one implementation, the call may be a circuit switched voice call. In another implementation, the call may be a voice call in a voice over internet protocol (VoIP) format. In yet another implementation, the call may include a voice component and/or a media component with their respective attributes. For example, the call may include IP multimedia core network subsystem (IMS) session content having voice call content in IMS domain and multimedia content in IMS domain.

In action 720, after a new service is received by system 706 for USIM2, system 706 may send a routing update request to HSS 710 to find a routing path for the service to UE 702. The routing update request may include information regarding USIM2 based operations of UE 702.

In action 722, HSS 710 may send a routing update response to system 706, where the routing update response may include information regarding multi-USIM based operations of UE 702 and at least one paging schedule of system 704.

In action 724, system 706 may schedule paging during at least one of the one or more operation gaps.

In action 726, USIM2 based operations of UE 702 may monitor a paging channel of system 706 during the one or more operation gaps. In one implementation, USIM1 based operations of UE 702 may further hold a service between USIM1 based operations and system 704.

In action 728, system 706 may send a paging message to USIM2 based operations of UE 702 to activate the service with UE 702 using USIM2 based operations, while the service between USIM1 based operation and system 704 is on hold.

In action 730, a USIM manager (e.g., USIM manager 134 in FIG. 1) may convey the paging message from USIM2 to USIM1 of UE 702, for example, through tunneling.

In action 732, UE 702 may send a hold message (e.g., an RRC-AS/NAS message) to system 704 using USIM1 based operations and the RF circuitry associated with USIM1 (e.g., RF1 in FIG. 1) to put a service (e.g., an active call and/or data session) between USIM1 based operations of UE 702 and system 704 on hold.

In action 734, upon putting the service (e.g., an active call and/or data session) between USIM1 based operations of UE 702 and system 704 on hold, USIM2 based operations of UE 702 may send a paging response to system 706 to activate the service with UE 702 using USIM2 based operations, while the service between USIM1 based operations and system 704 is on hold.

In some implementations, after the service (e.g., call) using second USIM based operation on system 706, UE 702 may revert back to system 704 to resume the service between USIM1 based operation and system 704. In some implementations, after the call using USIM2 based operation on system 706, UE 702 may stay in system 706 and end the service between USIM1 based operation and system 704. In some implementations, after receiving the paging message from system 706, USIM2 may first put a hold on the service between USIM2 and system 706, revert back to and finish the service between USIM1 and system 704, before resuming the service between USIM2 and system 706.

FIG. 8A is a flowchart diagram illustrating a method of implementing a multi-USIM based operation UE for activating a service (e.g., a call and/or data session) on a second network system while maintaining a network connection with the UE on a first network system by scheduling a paging message at a gap interval of a first USIM based operation, in accordance with example implementations of the present disclosure. As illustrated in FIG. 8A, flowchart 860 may include actions 862, 864, 866, 868, and 870. In the present implementation, the UE may correspond to UE 702 supporting multi-USIM based operations in FIG. 7.

In action 862, the UE may camp on the first PLMN using the first USIM based operation of UE. For example, in action 714 of FIG. 7, UE 702 may camp on system 704 using USIM1 based operations of UE 702.

In action 864, the UE may monitor a paging channel of the second PLMN during the one or more operation gaps of the first USIM based operation in the UE. For example, in action 726 of FIG. 7, UE 702 through USIM2 based operations may monitor a paging channel of system 706 during the one or more operation gaps of USIM1 based operations of UE 702.

In action 866, the UE may receive a paging message for the second USIM based operation from the second PLMN through the second USIM based operation during the one or more operations gaps after the second PLMN receives a call for the second USIM based operation. For example, in action 728 of FIG. 7, UE 702 may receive a paging message for USIM2 based operations from system 706 through USIM2 based operations during the one or more operations gaps after system 706 receives a service for USIM2 based operations.

In action 868, the UE may send a hold message to the first PLMN using the first USIM based operation. For example, in action 732 of FIG. 7, UE 702 may send a hold message to system 704 using USIM1 based operations of UE 702.

In action 870, the UE may send a paging response to the second PLMN using the second USIM based operation, while a service between the UE and the first PLMN is on hold. For example, in action 734 of FIG. 7, UE 702 may send a paging response to system 706 using USIM2 based operations of UE 702, while a service between USIM1 based operations and system 704 is on hold.

Figure 8B:
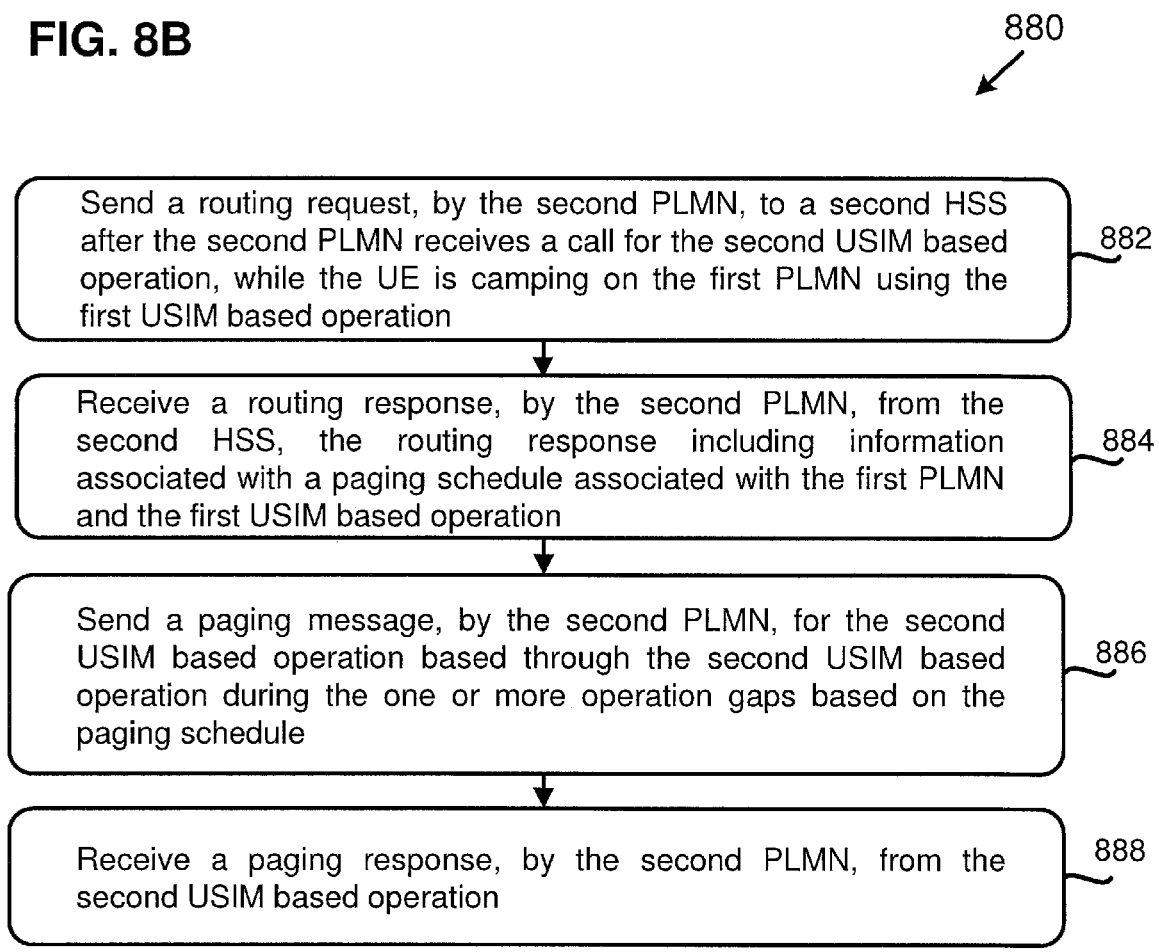
FIG. 8B is a flowchart diagram illustrating a method of a network for activating a service (e.g., a call and/or data session) with a UE on a second network system while maintaining a network connection with the UE on a first network system by scheduling a paging message during a gap interval of a first USIM based operation, in accordance with example implementations of the present disclosure.

FIG. 8B is a flowchart diagram illustrating a method of a network for activating a service (e.g., a call and/or data session) on a second network system while maintaining a network connection with a multi-USIM based operation UE on a first network system by scheduling a paging message at a gap interval of a first USIM based operation, in accordance with example implementations of the present disclosure. As illustrated in FIG. 8B, flowchart 880 may include actions 882, 884, 886, and 888. In the present implementation, the UE may correspond to UE 702 supporting multi-USIM based operations in FIG. 7.

In action 882, the second PLMN may send a routing request to a second HSS after the second PLMN receives a call for the second USIM based operation, while the UE is camping on the first PLMN using the first USIM based operation. For example, in action 720 of FIG. 7, system 706 may send a routing request to HSS 710 after system 706 receives a service for USIM2 based operations of UE 702, while UE 702 is camping on system 704 and using USIM1 based operations of UE 702.

In action 884, the second PLMN may receive a routing response from the second HSS. The routing response may include information associated with a paging schedule that is associated with the first PLMN and the first USIM based operation of the UE. For example, in action 722 of FIG. 7, system 706 may receive a routing response from HSS 710. The routing response may include information associated with system 704 and USIM1 based operations of UE 702.

In action 886, the second PLMN may send a paging message for the second USIM based operation through the second USIM based operation during the one or more operation gaps based on the paging schedule. For example, in action 728 of FIG. 7, system 706 may send a paging message for USIM2 through USIM2 based operations during the one or more operation gaps based on the paging schedule.

In action 888, the second PLMN may receive a paging response from the second USIM based operation. For example, in action 734 of FIG. 7, system 706 may receive a paging response from USIM2 based operations of UE 702.

The methods illustrated in FIG. 5 (along with FIGS. 6A and 6B) and 7 (along with FIGS. 8A and 8B) allow the delivery of a paging message destined to one USIM, while the UE is actively communicating with another USIM on a different network system. The method illustrated in diagrams 500 and 700 also allow the network to handle mobile-terminated data or control-plane activity occurrence on a suspended connection requested by the UE. Thus, paging collisions occurring in the UE among active multiple USIM based operations can be avoided. The methods allow a multi-USIM multi-network/operator supported UE to handle emergency calls and sessions. As such, the network and the UE can maintain RRC and CN states while moving from one system to another substantially without any interruption to either sessions/services. In addition, the methods illustrated in diagrams 500 and 700 allow the handling of service prioritization and specifying the UE behavior upon reception of paging information based on USIM configuration and/or user preferences.

CROSS REFERENCE

This Nonprovisional application claims priority under 35 U.S.C. § 119 on provisional Application No. 62/870,607 on Jul. 3 2019, the entire contents of which are hereby incorporated by reference.

What is claimed is:

1. A user equipment (UE) for wireless communication, the UE comprising:
   one or more non-transitory computer-readable media storing computer-executable instructions; and
   at least one processor coupled to the one or more non-transitory computer-readable media, and configured to execute the computer-executable instructions to:
   detect a presence of multiple-universal subscriber identity module (multi-USIM) based operations having at least a first USIM based operation and a second USIM based operation in the UE, the first USIM based operation belonging to a first Public Land Mobile Network (PLMN), the second USIM based operation belonging to a second PLMN different than the first PLMN;
   perform a first registration procedure, using the first USIM based operation, with the first PLMN; and
   perform a second registration procedure, using the second USIM based operation, with the second PLMN,
   wherein the UE receives information of one or more operation gaps during the first registration procedure, and performs the second registration procedure during at least one of the one or more operation gaps,
   the first USIM based operation is configured to access the first PLMN through first radio front-end (RF) circuitry,
   the second USIM based operation is configured to access the second PLMN through second RF circuitry, and
   after the first USIM based operation is registered with the first PLMN and the second USIM based operation is registered with the second PLMN, the at least one processor is further configured to execute the computer-executable instructions to:
   camp on the first PLMN using the first USIM based operation;
   receive a forwarded paging message addressed for the second USIM based operation from the first PLMN through the first USIM based operation after the second PLMN receives a call for the second USIM based operation;
   send a hold message to the first PLMN using the first USIM based operation; and
   send a paging response to the second PLMN using the second USIM based operation, while a service between the UE and the first PLMN is on hold.

2. A user equipment (UE) for wireless communication, the UE comprising:
   one or more non-transitory computer-readable media storing computer-executable instructions; and
   at least one processor coupled to the one or more non-transitory computer-readable media, and configured to execute the computer-executable instructions to:
   detect a presence of multiple-universal subscriber identity module (multi-USIM) based operations having at least a first USIM based operation and a second USIM based operation in the UE, the first USIM based operation belonging to a first Public Land Mobile Network (PLMN), the second USIM based operation belonging to a second PLMN different than the first PLMN;
   perform a first registration procedure, using the first USIM based operation, with the first PLMN; and
   perform a second registration procedure, using the second USIM based operation, with the second PLMN,
   wherein the UE receives information of one or more operation gaps during the first registration procedure, and performs the second registration procedure during at least one of the one or more operation gaps,
   the first USIM based operation is configured to access the first PLMN through first radio front-end (RF) circuitry,
   the second USIM based operation is configured to access the second PLMN through second RF circuitry, and
   after the first USIM based operation is registered with the first PLMN and the second USIM based operation is registered with the second PLMN, the at least one processor is further configured to execute the computer-executable instructions to:
   camp on the first PLMN using the first USIM based operation;
   monitor a paging channel of the second PLMN during the one or more operation gaps;
   receive a paging message for the second USIM based operation from the second PLMN through the second USIM based operation during the one or more operation gaps after the second PLMN receives a call for the second USIM based operation;
   send a hold message to the first PLMN using the first USIM based operation; and
   send a paging response to the second PLMN using the second USIM based operation, while a service between the UE and the first PLMN is on hold.

* * * * *